(12) United States Patent
Cahill

(10) Patent No.: US 9,418,537 B2
(45) Date of Patent: Aug. 16, 2016

(54) MOBILE COMPUTING DEVICE INCLUDING PERSONAL SECURITY SYSTEM

(71) Applicant: Peter Cahill, Arlington Heights, IL (US)

(72) Inventor: Peter Cahill, Arlington Heights, IL (US)

( * ) Notice: Subject to any disclaimer, the term of this patent is extended or adjusted under 35 U.S.C. 154(b) by 0 days.

(21) Appl. No.: 14/495,698

(22) Filed: Sep. 24, 2014

(65) Prior Publication Data

US 2015/0009011 A1 Jan. 8, 2015

Related U.S. Application Data

(63) Continuation of application No. 13/784,791, filed on Mar. 4, 2013, now abandoned.

(60) Provisional application No. 61/606,328, filed on Mar. 2, 2012.

(51) Int. Cl.
| | |
|---|---|
| *H04M 11/04* | (2006.01) |
| *G08B 25/01* | (2006.01) |
| *H04W 4/22* | (2009.01) |
| *G06F 3/0488* | (2013.01) |
| *G08B 25/00* | (2006.01) |

(52) U.S. Cl.
CPC ............ *G08B 25/016* (2013.01); *G06F 3/0488* (2013.01); *G08B 25/008* (2013.01); *H04W 4/22* (2013.01)

(58) Field of Classification Search
CPC ..... H04M 1/70; H04M 3/16; H04M 2203/60; H04M 12/00
See application file for complete search history.

(56) References Cited

U.S. PATENT DOCUMENTS

| | | | | |
|---|---|---|---|---|
| 2003/0043034 | A1* | 3/2003 | Baker | G08B 25/08 340/539.1 |
| 2004/0085195 | A1* | 5/2004 | McKibbon | 340/426.36 |
| 2004/0204806 | A1* | 10/2004 | Chen et al. | 701/36 |
| 2008/0061971 | A1* | 3/2008 | Lin | G08B 13/1409 340/568.1 |
| 2011/0230161 | A1 | 9/2011 | Newman | |
| 2012/0056742 | A1 | 3/2012 | Tedesco et al. | |
| 2012/0105203 | A1* | 5/2012 | Elliot et al. | 340/8.1 |
| 2012/0329420 | A1* | 12/2012 | Zotti et al. | 455/404.2 |
| 2013/0005294 | A1* | 1/2013 | Levinson et al. | 455/404.2 |
| 2013/0231077 | A1 | 9/2013 | Cahill | |

OTHER PUBLICATIONS

Office Action dated Nov. 5, 2014, regarding U.S. Appl. No. 13/784,791, 16 pages.

* cited by examiner

*Primary Examiner* — Keith Fang
(74) *Attorney, Agent, or Firm* — Richard Patent Law P.C.

(57) ABSTRACT

A mobile communication device includes at least one processor to display a user interface on a touch screen, the user interface comprising a button to receive a touch event, determine that the touch event is currently being received by the button and enter an alarm armed state, determine that the touch event ends and enter an alarm active state, and after a particular period of time in the alarm active state, trigger a communication to an emergency responder.

30 Claims, 8 Drawing Sheets

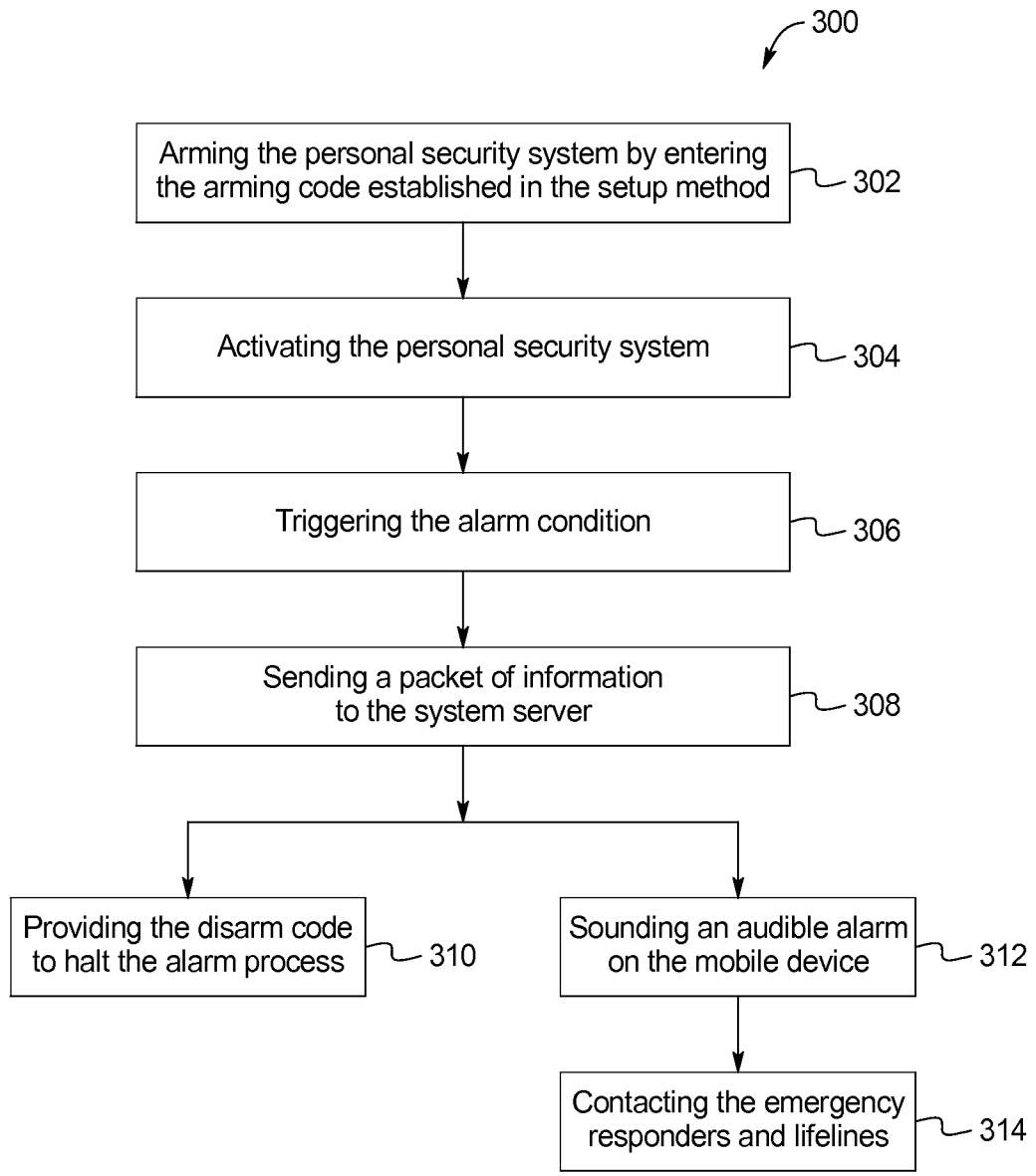

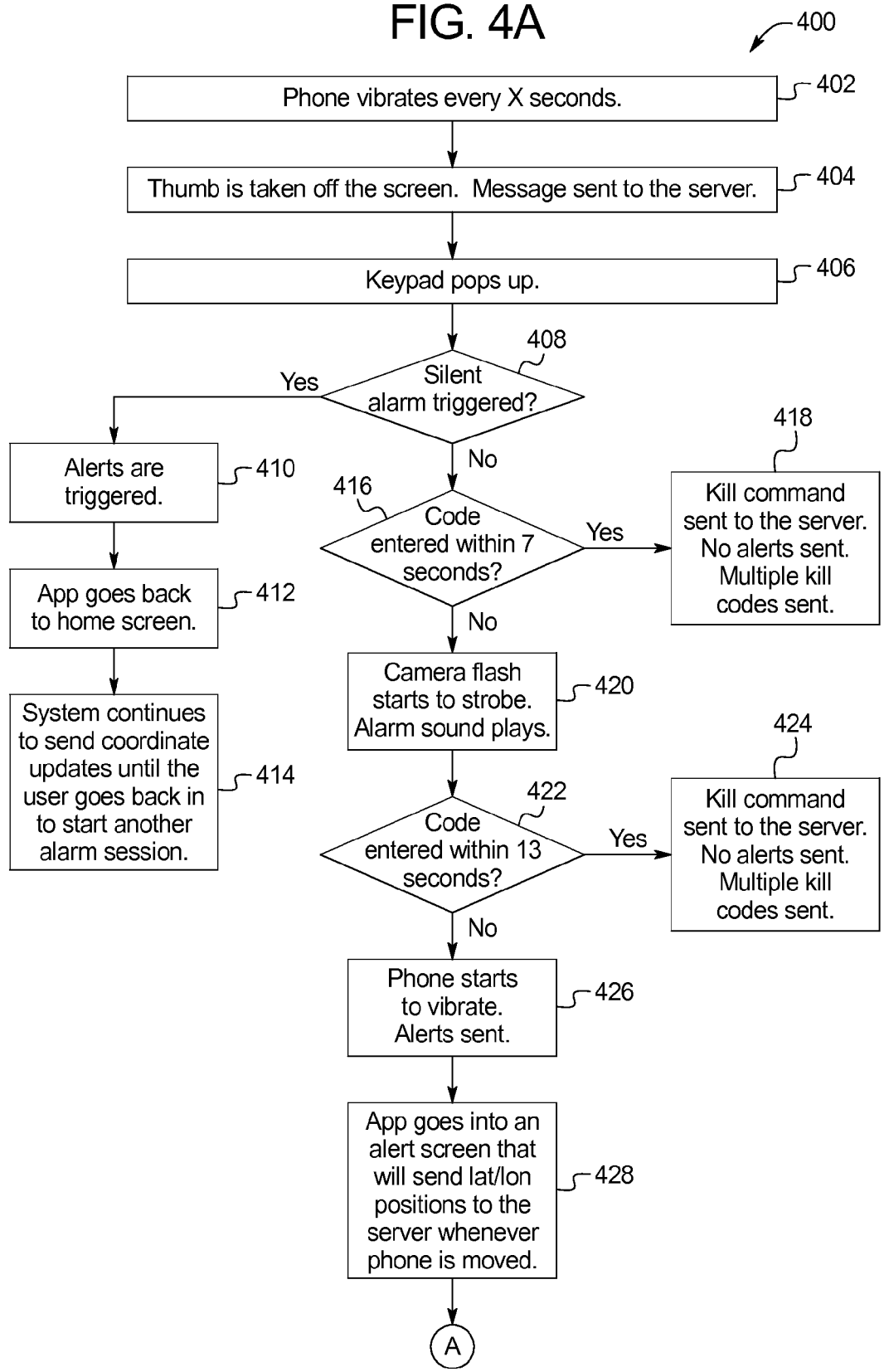

MOBILE COMPUTING DEVICE INCLUDING PERSONAL SECURITY SYSTEM

CROSS-REFERENCE TO RELATED APPLICATIONS

This application is a continuation of U.S. application Ser. No. 13/784,791 filed Mar. 4, 2013, entitled "Personal Security System," which claims the benefit of U.S. Provisional Application No. 61/606,328 filed on Mar. 2, 2012, entitled "Personal Security System," both of which are hereby incorporated herein by reference in their entirety.

BACKGROUND OF THE INVENTION

The present subject matter relates generally to a personal security system. More specifically, the present invention relates to a personal security system embodied in a mobile application. The primary embodiments described herein relate to a personal security system embodied in a mobile application in which a user may arm the system by making contact with a touch screen of a mobile device and the system may be triggered by breaking contact with the touch screen. However, additional embodiments are provided in which the personal security system embodied in a mobile application that is activated by a timer mode. In each of the embodiments, a verified alarm condition triggers communication to emergency first responders and additional predefined contacts, wherein the communication includes a live map location of the mobile device and direct dial phone number access information for the 911 command centers closest to the location of the mobile device.

Personal safety is an important consideration for everyone. Classic personal safety options include devices such as whistles, pepper spray, electroshock weapons, etc. As the use of mobile applications continues to increase, personal safety applications have made their way to market. Many have focused on tracking the mobile device. Other versions of personal security systems, focus on turning the mobile device into a communication command center during an emergency. While these applications may be useful and helpful, they do not necessarily address all of the needs of a user. For example, some of the most important requirements of a personal safety system are: (1) the ease of triggering an alarm condition; (2) the speed in communicating the alarm condition; (3) the redundancy in the communication to the emergency contacts; and (4) the ability to quickly contact the most appropriate 911 Command Centers; etc.

Accordingly, a need exists for a personal security system that meets these requirements and others, as described and claimed herein.

BRIEF SUMMARY OF THE INVENTION

The personal security system provided herein addresses the needs of users and provides an improvement over previously existing personal security systems. In particular, in one embodiment, the personal security system provided herein provides a mobile application in which the system may be armed by making physical contact with a touch screen on a mobile device and may be triggered by breaking physical contact with the touch screen, as described further herein. Additional embodiments are provided in which the personal security system embodied in a mobile application that is activated by a timer mode. In each of the various embodiments, a verified alarm condition triggers communication to emergency first responders and additional predefined contacts, wherein the communication includes a live map location of the mobile device and access information for the 911 Command Centers closest to the location of the mobile device. As will be recognized by those skilled in the art, the personal safety system may be embodied in components resident in a personal mobile device that are in communication with a central system server.

In a primary example, when a user first accesses the personal security system, the system must be set up (i.e., registered) for use. The first step in the setup process is for the user to provide the user demographic and personal information. For example, the user may provide a photograph and personal description (e.g., age, height, weight, hair color, eye color, etc.). This information may be used to identify the user in the case of an emergency event. The information may be collected by the system and stored at a central system server to be matched up with a triggered alarm, should the alarm be triggered in use.

The user may then input contact information for a number of emergency contacts, referred to herein as "lifelines." Lifelines are the contacts that will be automatically contacted when an alarm is triggered. The system may require a minimum number of lifelines (in one example, the minimum number of lifelines may be five) to ensure that the user does not bypass this important step in the setup process. As will be understood based on the descriptions provided herein, the greater number of lifelines provided, the greater redundancy in the system. Greater redundancy is critical to ensuring a triggered alarm is acted upon appropriately. In some embodiments, the personal security system may enable the lifeline contact information to be imported from the user's contacts stored on the mobile device or from a social media or other communication platform (e.g., Facebook, Gmail, etc.).

The lifelines may be confirmed by the personal safety system by sending a test message to each of the lifelines. The test message may, for example, require a response to confirm receipt. In some embodiments, the confirmation of the lifeline may require additional registration by the lifeline in the personal safety system.

The next step in the setup process may include providing the arm/disarm code(s) and/or panic code(s). In some embodiments, the personal safety system includes only a single arm/disarm code. Minimizing the number of codes/passwords required for operation of the personal safety system may make the system easier for a user to operate. However, certain embodiments of the personal safety system may include a greater number of codes and/or passwords for increased functionality For example, dedicated codes may be used to: (1) arm/disarm the system; and (2) trigger a panic code and/or silent alarm. For example, the user may have a code that, when entered into the mobile device during a triggered alarm condition, appears to disable the alarm condition, but in fact is a "silent alarm" that inconspicuously confirms the alarm condition.

At the end of the registration/setup process, the personal safety system may require confirmation of the setup by sending a test alarm signal to the system server. Such test signal would not trigger the system alarm (and further actions associated with the alarm), but it would confirm that the mobile device is communicating the information necessary to trigger an actual alarm.

In addition to the steps described above, the setup process may include setting separate home and travel settings. For example, different lifelines may be used for different situations. Additionally, specific contact information may be provided for 911 or other emergency authorities for various locations in which the user knows the personal safety application will be used. In preferred embodiments, the central server of the system may have access to a database (or other data storage mechanism) in which 911 Command Centers are associated with defined geo-fences such that when provided a given GPS location, the system may identify the one or more 911 Command Center direct dial phone numbers that are geographically closest to the GPS location so the system can provide the most appropriate 911 number to the user, the lifelines, and to a response verification call center (described further herein).

After the registration steps above and, optionally, confirmation, the personal safety system is ready for use. As described, the personal safety system may be embodied in a mobile application resident on a mobile device. A user may activate the personal safety system for use by initiating the mobile application on the mobile device.

Upon opening the mobile application, the user may arm the system by entering the arming code established in the registration process. After the arming code is entered, the mobile device's screen may change color from green (unarmed) to red (armed). In an alternative embodiment, the mobile device may cycle between unarmed, ready, and armed conditions. Variations in modes provided will be recognized by those skilled in the art based on the disclosures provided herein.

After the screen changes color, the user may be prompted to make contact with the mobile device, for example, by making contact with a touch screen or by pressing a button on the mobile device. As long as the user maintains contact with the mobile device, the personal safety system will be active and armed. In certain embodiments, the user may be required to contact a specific point on the touch screen to activate the alarm system. For example, a circular icon may appear on the screen to be contacted to activate the alarm. In a further example, the icon may move around the screen such that the user must be very deliberate in making contact with the screen in order to activate the alarm.

The alarm triggering process is initiated when the user discontinues contact with the mobile device in the manner required to activate the alarm. For example, if making contact with the mobile device's touch screen arms the alarm, the alarm triggering process is initiated when the user breaks contact with the touch screen. Similarly, if depressing one of the mobile device's volume buttons arms the alarm, the alarm triggering process is initiated when the user stops depressing the volume button.

After initiating the alarm triggering process, a packet of information is sent to the system server. In some embodiments of the personal safety system, the packet of information may be the smallest packet of information required to communicate the alarm to the system server. For example, the packet may include the trigger and the user's geo-location. By minimizing the size of the information packet being sent, it is less likely that the communication will be interrupted, intentionally or unintentionally For example, it may be possible for a small information packet to be communicated from the device in between the time the user loses contact with the device and the time device hits the ground. Similarly, the information should be communicated before an attacker has an opportunity to identify the alarm and destroy the mobile device.

When the system server receives the packet of information, the system server may hold the packet of information in a queue for a limited time before releasing the alarm and contacting the lifelines and authorities. During this period of time, the user may provide the disarm code to halt the alarm process. For example, a user may have a 20 second window within which the disarm code may be entered before the alarm conditions are fully met. Of course, various durations may be used and, in one contemplated embodiment, the user may select a specific duration during the setup process.

In addition, an audible alarm may be presented through the mobile device. The audible alarm may be activated a short duration of time after the alarm condition is triggered (e.g., contact with the mobile device is lost). For example, the audible alarm may sound seven seconds after contact is broken. The audible alarm may be any sound, including traditional alarm sounds, as well as recorded messages, such as, "the police have been contacted."

If the duration of time within which the disarm code may be received passes without receipt of the disarm code, the system server notifies the public safety authorities or other intermediaries (e.g., local 911 based on the user's geo-location) and contacts the user's lifelines. Accordingly, from triggering of the alarm condition (e.g., the breaking of contact with the mobile device) to the contacting of the authorities and lifelines may be a matter of seconds.

In a preferred embodiment, the triggering of an alarm condition sends the packet of information to a system server that is associated with a designated response verification call center. The response verification call center may receive the information sent, confirm the alarm condition, and coordinate the communications to the authorities and to the lifelines. It is understood that such functionality may be provided by automated response verification call centers, as well as those that include live human operators/representatives.

In a preferred embodiment, the system server provides an event portal accessible to the user, the lifelines, any relevant emergency response personnel, and any response verification call center operators/representatives. In a preferred embodiment, the portal provides an event panel through which the various parties can access information related to the verified alarm condition. For example, the event panel may provide an event ID and a user name for quickly identifying the user in question and providing a convenient manner to track the data related to the alarm condition. The event panel may further provide an approximate event address that identifies the current location of the mobile device and/or the location at which the mobile device was located when the alarm condition was triggered. The event panel may further provide a map that identifies the relevant locations (e.g., current/initial event locations, location of emergency response personnel, etc.) and updates in real-time.

Additional information provided by the event panel may include: user identification information, such as, gender, height, weight, hair color, eye color, ethnicity, etc.; a personal question and answer used to verify the user to disable the alarm condition (e.g., Q: What street did you grow up on? A: Flintwood Drive); and the one or more direct dial phone numbers for the 911 Command Centers in closest proximity to the event location. The event panel may provide functionality through which the system server may clear the alarm condition, confirm appropriate action has been taken, perform various reporting functionality (e.g., reporting to authorities and emergency response personnel, reporting to lifelines, reporting the resolution of the event, etc.), initiate the identification process (e.g., automatically prompt the response verification call center operator/representative to identify the user to confirm or clear an alarm condition), amongst any other functionality that will be apparent to those skilled in the art based on the description provided herein.

In a preferred embodiment, the information provided to the lifelines may include a set of instructions and location-based information. In one example, the instructions may include clear and succinct instructions adapted to most clearly help the lifelines respond appropriately. For example, a set of instructions may include a numbered list of instructions, such as:
1. Do not call the user.
2. Write this address down. This is the closest address to where the Distress Alert was activated. [Address provided.]
3. Click on the LOCATION tab (referencing a location tab on the lifeline's screen).
4. Refer to the map of the user's location. Use the zoom feature to better access the area.

The location tab may include the one or more direct dial phone numbers for the 911 Command Centers in closest proximity to the event location and a real-time updating map identifying the event location. Of course many variations of the information provided to the lifelines may be implemented.

In addition to the features and functions described above, the personal safety system may further provide various recording and/or streaming audio and/or video functions. For example, once a user breaks contact with the armed mobile device, the mobile device may immediately start recording and/or streaming audio and/or video. Any recording may be captured within the mobile device. Any streaming may be provided to the system server. These functions may be helpful in identifying an assailant or otherwise understanding what occurred immediately following the breaking of contact with the mobile device. It is contemplated that in certain versions, the mobile device may record and/or stream audio and/or video anytime the alarm is activated, such that the audio and/or video may be used to identify the events preceding and/or succeeding the time the user breaks contact with the armed mobile device.

It is contemplated that the examples provided above are merely preferred examples of the personal security system under certain conditions. It is contemplated that there may be other versions of the personal security system for other conditions. For example, while the embodiments described above may be preferred for personal security systems used by an individual walking from one secured area to another (e.g., from an office to a car), it is believed that a similar system may be adapted for different situations. In one example, a babysitting version of the personal security system may be implemented such that once the alarm is activated, the alarm condition may be triggered by shaking the mobile device to activate the accelerometer. In such cases, the personal safety application may run in the background of the mobile device, rather than as the active application. Similarly, embodiments of the personal safety application may include a timed operation whereby a user inputs a duration of time or an absolute time after which an alarm condition is triggered if not previously disarmed.

For example, a user bringing home groceries from the grocery store may set a timer for a period of time just longer than it will take to get home. If the user does not disarm the personal security system prior to that period of time expires, the personal security system will trigger the alarm condition, which will start a twenty second countdown to disarm the personal security system before the alarm condition is verified.

There are various ways in which incoming calls, messages, and other alerts to the mobile device may be handled while the personal security application is active. For example, in order to allow a call to come through without forcing the user to break contact with the mobile device, the mobile device may automatically answer on speakerphone while the personal security application is active. Alternatively, any incoming call may be routed to voicemail with an alternate greeting indicating that the user is currently using the personal security system and cannot answer the phone at that moment.

The personal security system may be monetized in numerous ways. For example, the personal security system may include advertising within the mobile application (e.g., on a splash screen, on banners, etc.). In addition, the user may opt-in for SMS or MMS based ads, geo-fencing ads, etc.

In one embodiment, a personal security system includes: a system server adapted to receive communications from a mobile electronic device and provide communications to at least a selected one of a plurality of 911 command centers; wherein the system server is adapted to receive a triggered alarm condition from a mobile electronic device, the triggered alarm condition including a geo-location of the mobile electronic device at the time the alarm condition is triggered, wherein the mobile electronic device includes a processor and a user input mechanism, wherein the processor is adapted to provide geo-location services and communication services adapted for communicating with the system server, wherein the processor is further adapted to: receive a command from a user to provide an armed alarm condition; initiate the armed alarm condition by receiving a continuous user command through the user input mechanism, wherein the continuous user command requires an active physical touch from the user; when the user ceases to provide the active physical touch required to maintain the continuous user command, trigger an alarm condition; and in response to the triggered alarm condition, communicate the geo-location of the mobile electronic device at the time the alarm condition is triggered to the remote server; wherein the system server is further adapted to, subsequent to receiving the triggered alarm condition, either receive a user command to disarm the triggered alarm condition or verify the triggered alarm condition; and if the triggered alarm condition is verified, the system server is adapted to communicate the geo-location of the mobile electronic device at the time the alarm condition is triggered to the at least a selected one of the plurality of 911 command centers and further to a plurality of additional contacts.

In some examples, the user input mechanism is provided through a capacitive touch screen. In others, the user input mechanism is provided through a physical or virtual button.

The additional contacts are typically emergency contacts that are defined by the user prior to the triggering of the alarm condition.

The at least a selected one of a plurality of 911 command centers may be selected using the geo-location of the mobile electronic device at the time the alarm condition is triggered in combination with a database of geo-fenced location data for a plurality of 911 command centers. The selected 911 command centers may be chosen as being those nearest to the geo-location of the mobile electronic device at the time the alarm condition is triggered. Direct contact information may be provided for each of the selected 911 command centers. For example, the at least a selected one of a plurality of 911 command centers may include the three 911 command centers located nearest the geo-location of the mobile electronic device at the time the alarm condition is triggered.

In some embodiments, the user command to disarm the triggered alarm condition is a disarm code. Alternatively, the user command to disarm the triggered alarm condition may be the correct answer to a question answer challenge presented to the user.

In a preferred embodiment, the triggered alarm condition is verified if the user command to disarm the triggered alarm condition is not received within twenty seconds from the triggering of the alarm condition. Of course there are numerous manners in which the triggered alarm condition may be verified.

In another example, a personal security system includes: a mobile electronic device including a processor and a user input mechanism, wherein the processor is adapted to provide an alarm trigger, wherein the processor is further adapted to: receive a command from a user to provide an armed alarm condition; initiate the armed alarm condition by receiving a continuous user command through the user input mechanism, wherein the continuous user command requires an active physical touch from the user; and when the user ceases to provide the active physical touch required to maintain the continuous user command, trigger an alarm condition.

In response to triggering the alarm condition, the processor may communicate geo-location information to a remote server, wherein the geo-location information identifies the geo-location of the mobile electronic device at the time the alarm condition is triggered. Direct contact information may be determined for one or more 911 command centers based on the geo-location information.

In one example, the continuous user command that requires an active physical touch from the user may be contact with a capacitive touch screen. In another example, the continuous user command that requires an active physical touch from the user may be contact with a specific position located on a capacitive touch screen. In still another example, the continuous user command that requires an active physical touch from the user may be the activation of a physical switch.

A method of triggering an alarm condition under duress may include providing a mobile electronic device including a touch responsive user control for which, when placed in active mode, the mobile electronic device is prevented from triggering an alarm condition by an active user input received through the user control and, when the active user input is no longer received through the user control, the alarm condition is triggered, such that, when the alarm condition is triggered geo-location information is communicated to a remote server, wherein the geo-location information identifies the geo-location of the mobile electronic device at the time the alarm condition is triggered.

The direct contact information for one or more 911 command centers may be determined based on the geo-location information communicated to the remote server. The active user input may be contact with a capacitive touch screen. The active user input may be activation of a physical switch.

An advantage of the personal security system is to provide an easy to use personal security system.

Another advantage of the personal security system is a simplified alarm triggering mechanism.

A further advantage of the personal security system is an efficient communication of an alarm condition between a mobile device and a central system server.

Yet another advantage of the personal security system is that it provides increased redundancy by requiring a plurality of lifelines to be contacted in the event the alarm is triggered.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 3 is a flow chart illustrating the steps of a method of operating a personal safety system.

FIGS. 4A and 4B are a flow chart illustrating the steps of a method of operating a personal safety system.

DETAILED DESCRIPTION OF THE INVENTION

Figure 1:
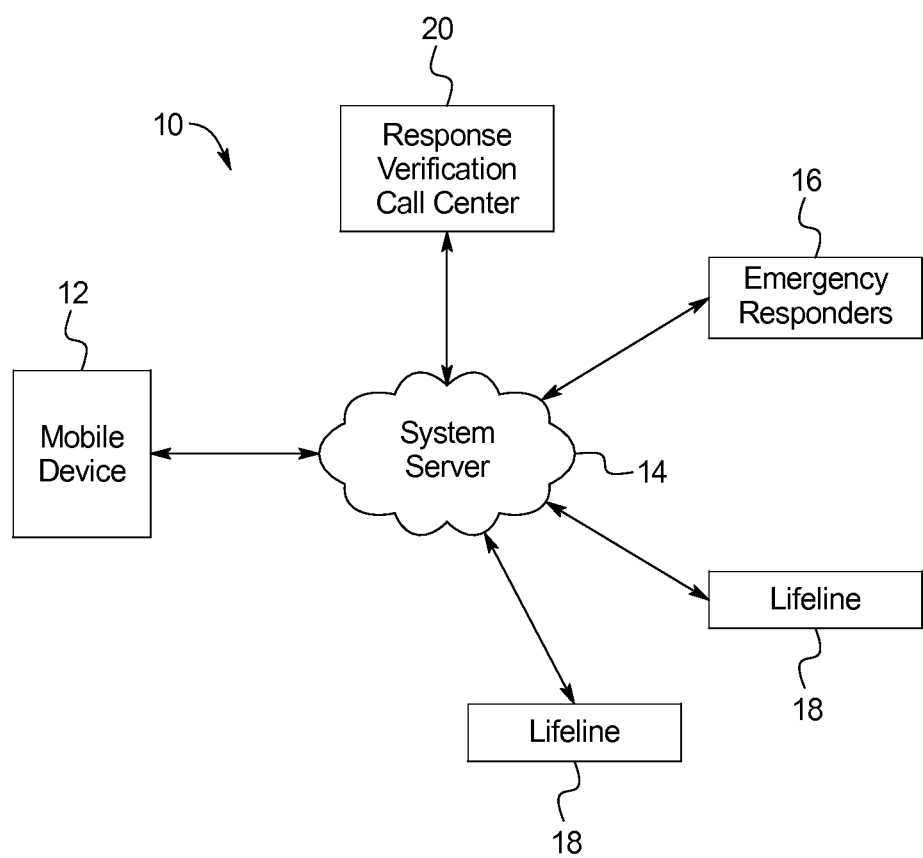
FIG. 1 is a schematic representation of an example of the elements of the personal security system.

FIG. 1 illustrates an example of a personal security system 10. As shown in FIG. 1, the personal security system 10 may include a mobile device 12 in communication with a system server 14. Further, the system server 14 may be in communication with one or more emergency responders 16 and one or more lifelines 18 (as used herein, lifelines are user defined contacts that are contacted in case of an emergency event). As shown, the system server 14 may be associated with a response verification call center 20 through which one or more operators/representatives may interact with the system 10.

In some examples, the mobile device 12 may be in one-way communication with the system server 14 (e.g., syncing setup information and communicating alarm conditions). Of course, in other embodiments, the mobile device 12 may be in two-way communication with the system server 14 (e.g., syncing setup information and communicating alarm conditions, as well as, confirming receipt of information received by the system server 14). While shown and described as a singular system server 14, it is understood that the system server 14 may be any number of system servers 14 adapted to support the necessary data management to support the various features and functions of the personal safety system 10 described herein. Further, while the preferred embodiments described herein refer to the system server 14, it is understood that a system server 14 may not be a requirement of the personal safety system 10 described herein, and that any other suitable mechanism or mode of data management may be employed.

The mobile device 12 may be any mobile device that enables the communication described herein. For example, various makes and models of touch screen smartphones are presently preferred as the mobile device 12. However, it is understood that various mobile devices 12 may function as the mobile device 12, including, tablet computers, personal navigation devices, digital cameras, and other electronic mobile devices 12 that are capable of geo-location and communication.

The emergency responders 16 shown in FIG. 1 may be any one or more organizations appropriate for responding to an event triggering an alarm condition, as described herein. In preferred embodiments, the emergency responders 16 shown in FIG. 1 represent one or more 911 Command Centers and their associated emergency services (e.g., police department, fire department, emergency medical response team, etc.). However, it is understood that the various organizations represented by the emergency responders 16 will be understood by those skilled in the art based on the disclosures provided herein. The lifelines 18 shown in FIG. 1 represent user defined emergency contacts that are to be contacted in the event that an alarm condition is triggered and verified. As described further herein, in the event of a triggered and verified alarm condition, the system server 14 provides emergency responders 16 and the lifelines 18 an event portal 22 (FIG. 5) and additional information 24 (FIGS. 6a and 6b) as described further herein.

Figure 2:
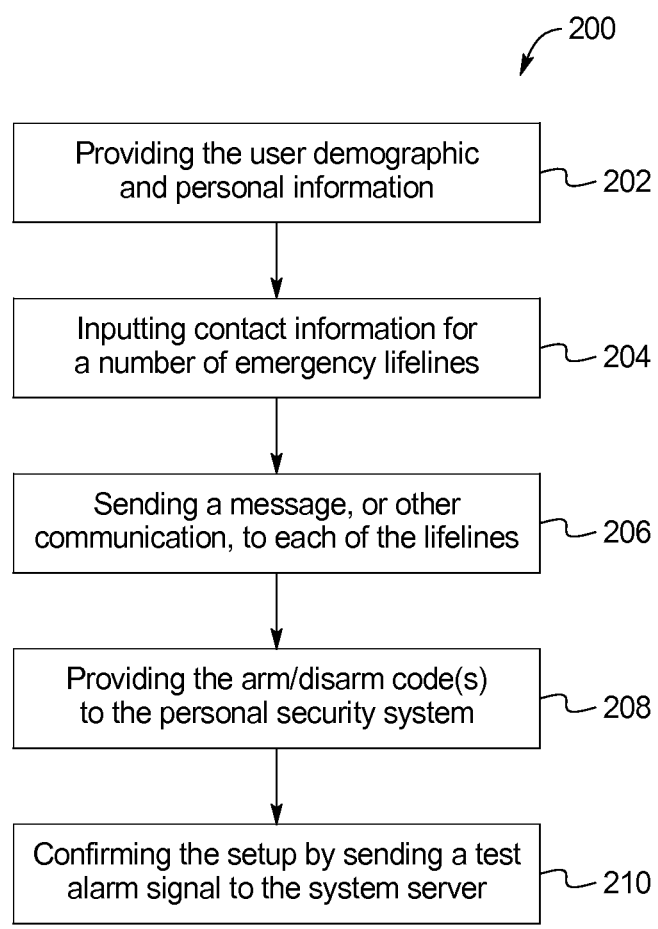
FIG. 2 is flow chart illustrating the steps of a method of setting up and registering a personal safety system.

Turning now to FIG. 2, a method 200 of setting up and registering a personal safety system is shown (setup method 200). The first step 202 in the setup method 200 is providing the user demographic and personal information. This is the information that the personal safety system 10 will communicate to the emergency responders 16 and lifelines 18 to identify the user in the event of a triggered and verified alarm condition. For example, the user may provide a photograph and personal description (age, height, weight, hair color, eye color, ethnicity, etc.). Any other identification and demographic information may be provided as part of this first step 202. The information may be collected and stored by the system server 14 to be matched up with a triggered alarm, should the alarm be triggered in use.

As further shown in FIG. 2, the second step 204 may include inputting contact information for a number of lifelines 18. These lifelines 18 are the contacts that will be automatically contacted when an alarm is triggered and verified within the personal security system 10. The personal security system 10 may require a minimum number of lifelines 18 to ensure that the user does not bypass this important step in the setup method 200. For example, in a preferred embodiment, the minimum number of lifelines 18 is five. The greater number of lifelines 18 provided, the greater redundancy in the personal security system 10. Redundancy is critical to ensuring a triggered alarm is acted upon appropriately. Accordingly, the personal security system 10 may require a minimum number of lifelines 18 greater than one. In some embodiments, the personal security system 10 may enable the lifeline contact information to be imported from the user's contacts stored on the mobile device 12 or from a social media or other communication platform (e.g., Facebook, Gmail, etc.).

In an optional third step 206, the lifelines 18 provided by the user may be confirmed by the personal safety system 10 by sending a test message, or other communication (e.g., a test phone call), to each of the lifelines 18. The test message may, for example, require a response by the lifeline 18 to confirm receipt. In some embodiments, the confirmation of the lifeline 18 may require the registration of the lifeline 18 in the personal safety system 10.

The fourth step 208 of the setup method 200 may be providing the arm/disarm code(s) and/or panic code(s) to the personal security system 10. In a preferred embodiment, the personal safety system 10 includes only a single arm/disarm code. Minimizing the number of codes/passwords required for operation of the personal safety system 10 may make the system 10 easier for a user to operate. However, certain embodiments of the personal safety system 10 may include a greater number of codes and/or passwords for increased functionality. For example, dedicated codes may be used to: (1) arm/disarm the system; and (2) trigger a panic code and/or silent alarm. For example, the user may have a code that, when entered into the mobile device 12 during a triggered alarm condition, appears to disable the alarm condition, but in fact is a "silent alarm" that inconspicuously confirms the alarm condition to the system server 14.

The final step 210 in the setup method 200 may be confirming the setup by sending a test alarm signal to the system server 14. Such test signal would not trigger the alarm condition (and further actions associated with a verified alarm condition), but it would confirm that the mobile device 12 is communicating the information necessary to trigger an actual alarm condition.

Turning now to FIG. 3, a method 300 of operating the personal security system 10 (operation method 300) is shown. As shown, the first step 302 in the operation method 300 is arming the personal security system 10 by entering the arming code established in the setup method 200. After the arming code is entered in the first step 302, the screen of the mobile device 12 may change color or otherwise indicate the personal security system 10 is armed. For example, the screen of the mobile device 12 may change color from green (unarmed) to red (armed). In another example, the mobile device 12 may cycle between three modes: (1) unarmed; (2) ready; and (3) armed conditions. For example, the screen of the mobile device 12 may change color from green (unarmed) to yellow (ready) to red (armed). Of course, in other embodiments, arming the mobile device 12 may not result in any visual distinction or change in colors.

The second step 304 in the operation method 300 shown in FIG. 3 is activating the personal security system 10. For example, after the screen of the mobile device 12 changes color, the user may be prompted to make contact with the mobile device 12, for example, by making contact with a touch screen or by pressing a button on the mobile device 12. As long as the user maintains contact with the mobile device 12, the personal safety system 10 will be active and armed. In certain embodiments, the user may be required to contact a specific point on the touch screen to activate the personal security system 10. For example, a circular icon may appear on the screen to be contacted to activate the alarm. In a further example, the icon may move around the screen such that the user must be very deliberate in making contact with the screen in order to activate the personal security system 10.

As further shown in FIG. 3, the third step 306 in the operation method 300 is triggering the alarm condition. The third step 306 of triggering the alarm condition is initiated when the user discontinues contact with the mobile device 12 in the manner required to activate the alarm as described above with respect to the second step 304. For example, if making contact with the touch screen of the mobile device 12 arms the alarm, the alarm triggering process is initiated when the user breaks contact with the touch screen. Similarly, if depressing one of the volume buttons on the mobile device 12 arms the alarm, the alarm triggering process is initiated when the user stops depressing the volume button.

After the third step 306 of triggering the alarm condition is executed, a fourth step 308 of sending a packet of information to the system server 14 is triggered. In some embodiments of the personal safety system 10, the packet of information may be the smallest packet of information required to communicate the alarm condition to the system server 14. For example, the information packet may include only the trigger and the user's geo-location. By minimizing the size of the information packet being sent, it is less likely that the communication will be interrupted, intentionally or unintentionally For example, it may be possible for a small information packet to be communicated from the mobile device 12 in between the time the user loses contact with the mobile device 12 and the time mobile device 12 hits the ground. Similarly, the information should be communicated before an attacker has an opportunity to identify the alarm and destroy the mobile device 12.

When the system server 14 receives the packet of information, the system server 14 may hold the packet of information in a queue for a limited time before releasing the alarm and contacting the lifelines 18 and emergency responders 16 or other intermediaries. During this period of time, the user may perform the fifth step 310 of providing the disarm code to halt the alarm process. For example, a user may have a 20 second window within which the disarm code may be entered before the alarm conditions are fully met. Of course, various durations may be used and, in certain embodiments of the personal security system 10, the user may select a specific duration during the setup method 200.

In addition, an audible alarm may be provided through the mobile device 12. The audible alarm may be activated a short duration of time after the contact with the mobile device 12 is lost. For example, the audible alarm may sound seven seconds after contact is broken. The audible alarm may be any sound, including traditional alarm sounds, as well as recorded messages, such as, "the police have been contacted." This step is shown in FIG. 3 as a sixth step 312 of sounding an audible alarm on the mobile device 12.

If the duration of time within which the disarm code may be received passes without receipt of the disarm code, a seventh step 314 is triggered and the system server 14 notifies the emergency responders 16 (e.g., local 911 Command Center based on the user's geo-location communicated at the time the alarm condition is triggered) and lifelines 18. Accordingly, from the breaking of contact with the mobile device 12 in the third step 306 to the contacting of the emergency responders 16 and lifelines 18 in the seventh step 314 may be a matter of seconds.

While described above with respect to an embodiment in which the alarm condition is triggered by a break in contact with a touchscreen or button on the mobile device 12, it is understood that an alarm condition may be triggered by a timed operation in which a user inputs a duration of time (or an absolute time) after which an alarm condition is triggered, if not previously disarmed. Such embodiments may operate substantially the same as others described herein, other than the change in the trigger mechanism.

Figure 4B:
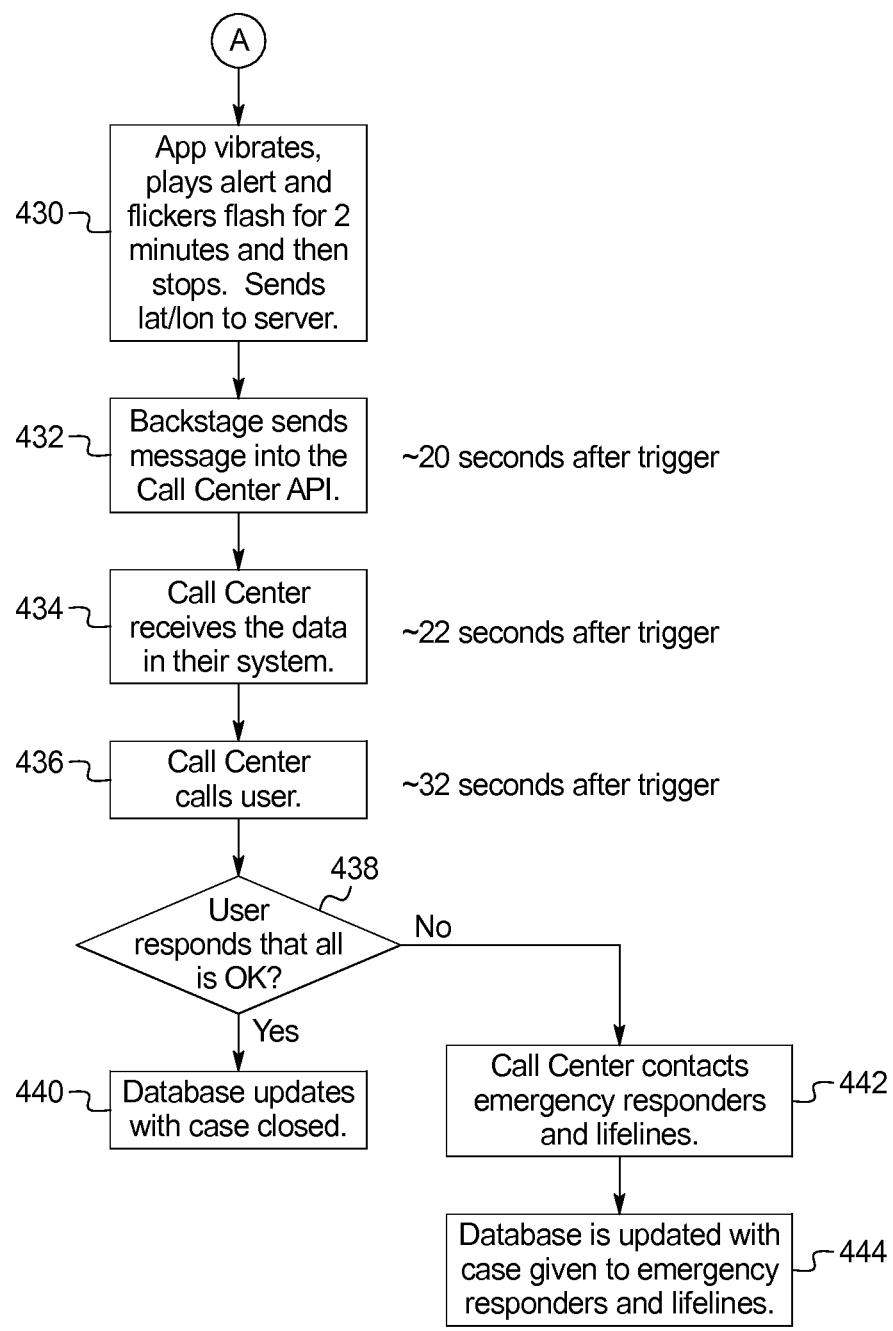

Turning now to FIGS. 4A and 4B (referred to herein collectively as FIG. 4), another method 400 (operation method 400) of operating the personal security system 10 is shown. As shown in FIG. 4, the operation method 400 shown in FIG. 4 details an example of the operation of the mobile device 12 while the mobile device 12 is in an armed mode. Of course, this is merely one example and it will be understood by those skilled in the art that other embodiments may be employed.

As shown in FIG. 4, after the mobile device 12 enters "armed mode," the first step 402 is the mobile device 12 (e.g., phone) vibrates every X seconds, where X is a predetermined number and/or a user controlled number. Then, as shown in step 404, when the user's thumb is taken off the screen, a message is sent to the system server 14. Next, a keypad is displayed on the screen, as shown in step 406.

Then, as shown in step 408, the mobile device 12 determines whether to trigger the silent alarm. If the silent alarm is triggered (e.g., by the input of a silent alarm code by the user), the alerts are triggered in step 410, the app goes back to the home screen in step 412, and the system continues to send coordinate updates until the user goes back in to start another alarm session in step 414. This enables the mobile device 12 to appear as though it has been disarmed, even while continuing the alarm process.

If the silent alarm is not triggered, the mobile device 12 determines whether the appropriate code was entered within seven seconds in step 416. If it was, a kill command is sent to the system server 14 and no further alerts are sent to or from the system server 14, as shown in step 418. In this example, multiple kill codes are sent to ensure the system server 14 receives the kill code in step 418. If the appropriate code was not entered within seven seconds, the camera flash starts to strobe and the alarm sound plays, as shown in step 420.

Next, the mobile device 12 determines whether the appropriate code was entered within 13 seconds, as shown in step 422. If so, the kill command is sent to the system server 14 and no alerts are sent to the system server 14, as shown in step 424. In this example, multiple kill codes are sent to ensure the system server 14 receives the kill code in step 424. If the appropriate code was not entered within 13 seconds, the mobile device 12 starts to vibrate and an alert is sent to the system server 14, as shown in step 426, and the app goes into an alert screen that will send latitude and longitude positions to the system server 14 whenever the phone is moved, as shown in step 428. Then the mobile device 12 vibrates, plays an alert, flickers the flash for two minutes and then stops, and sends the latitude and longitude coordinates to the system server 14, as shown in step 430. The system server 14 sends a message into a call center API, as shown in step 432, the call center receives the data into their system in step 434, and the call center calls the user in step 436. For example, the call center may be the response verification call center 20 shown in FIG. 1.

As shown in step 438, the user has an opportunity to respond that all is OK. If the user responds that all is OK, the system server 14 updates the matter as a closed case, as shown in step 440. Alternatively, if the user does not respond that all is OK, the system server 14 contacts the emergency responders 16 and lifelines 18 in step 442 and the system server 14 is updated and the case is communicated to the emergency responders 16 in step 444.

Figure 5:
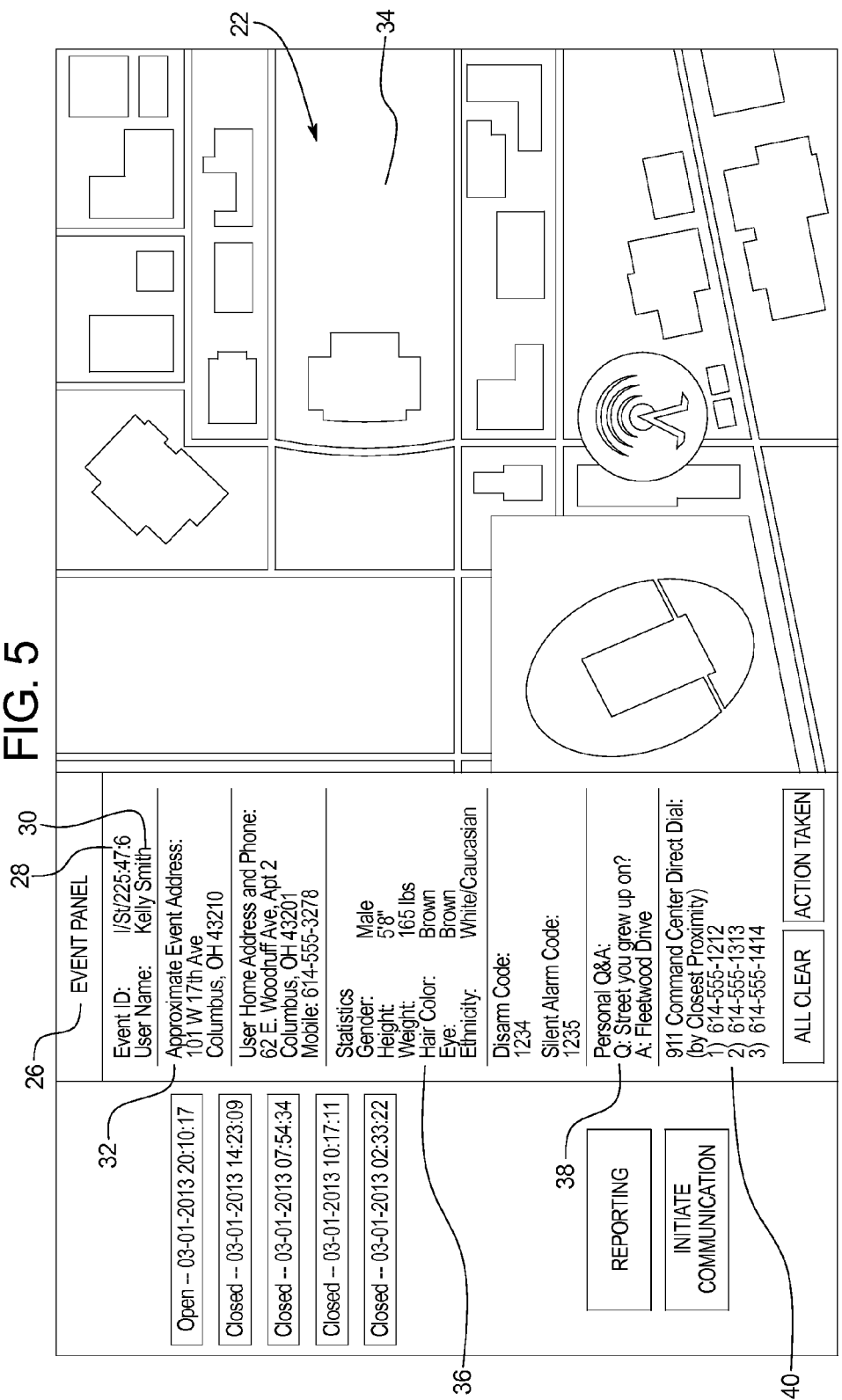
FIG. 5 is an example of an event panel provided through an event portal.

Turning now to FIG. 5, in instances in which an alarm condition is triggered, the system server 14 may provide an event portal 22 accessible to the user, the response verification call center 20, the lifelines 18, and the emergency responders 16. In a preferred embodiment, the event portal 22 provides an event panel 26 through which the various parties can access information related to the verified alarm condition. For example, the event panel 26 may provide an event ID 28 and a user name 30 for quickly identifying the user in question and providing a convenient manner to track the data related to the alarm condition. The event panel 26 may further provide an approximate event address 32 that identifies the current location of the mobile device and/or the location at which the mobile device was located when the alarm condition was triggered. The event panel 26 may further provide a map 34 that identifies the relevant locations (e.g., current/initial event locations, location of emergency response personnel, etc.) and updates in real-time.

As shown in FIG. 5, additional information provided by the event panel 26 may include: user identification information 36, such as, gender, height, weight, hair color, eye color, ethnicity, etc.; a personal question and answer 38 used to verify the user to disable the alarm condition (e.g., Q: What street did you grow up on? A: Flintwood Drive); and the one or more direct dial phone numbers for the 911 Command Centers in closest proximity to the event location 40. The event panel 26 may provide functionality through which the system server 14 may clear the alarm condition, confirm appropriate action has been taken, perform various reporting functionality (e.g., reporting to authorities and emergency response personnel, reporting to lifelines, reporting the resolution of the event, etc.), initiate the identification process (e.g., automatically prompt the response verification call center operator/representative to identify the user to confirm or clear an alarm condition), amongst any other functionality that will be apparent to those skilled in the art based on the description provided herein.

Figure 6A:
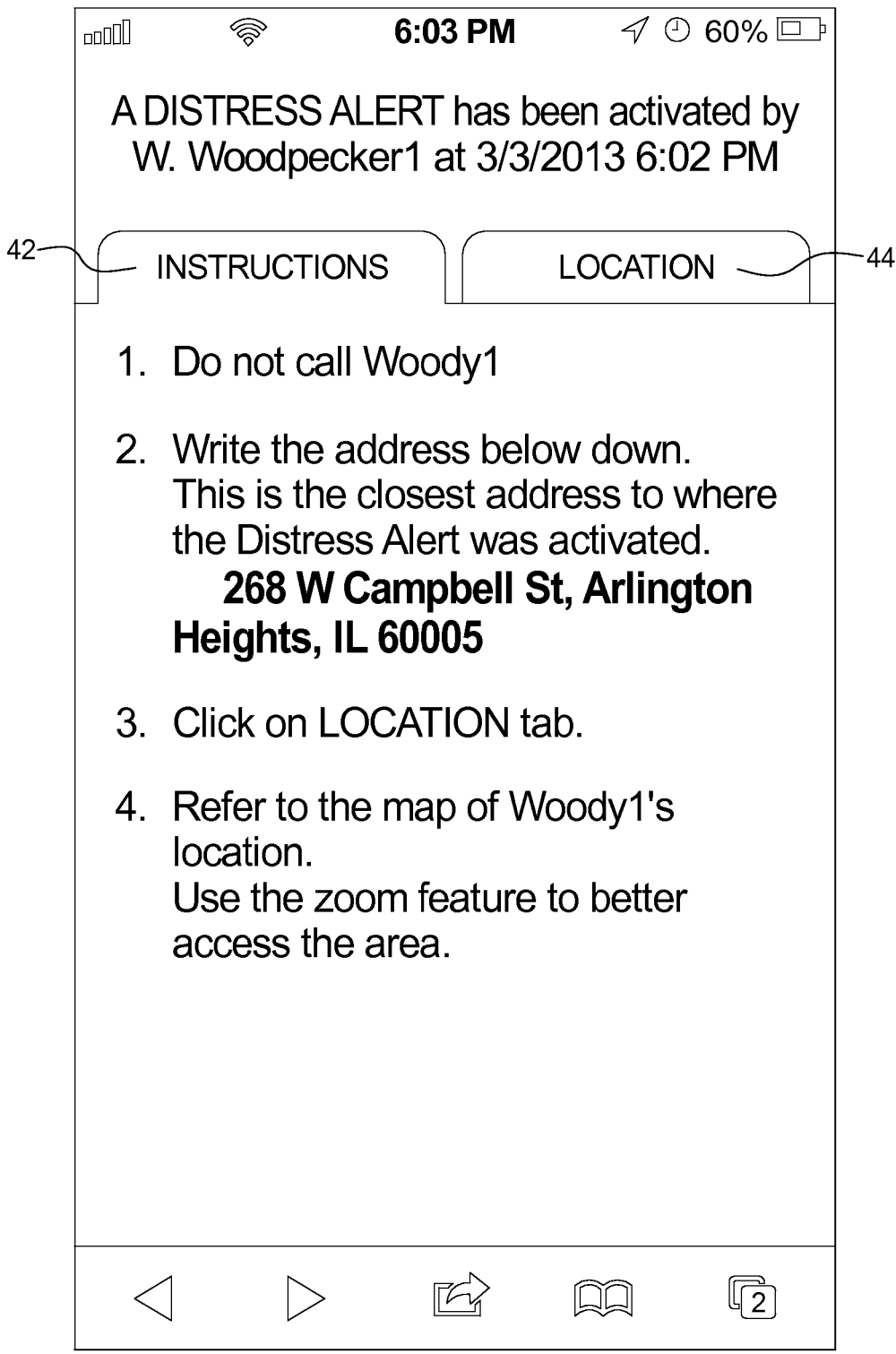
FIG. 6a is an example of instructions provided to lifelines.
Figure 6B:
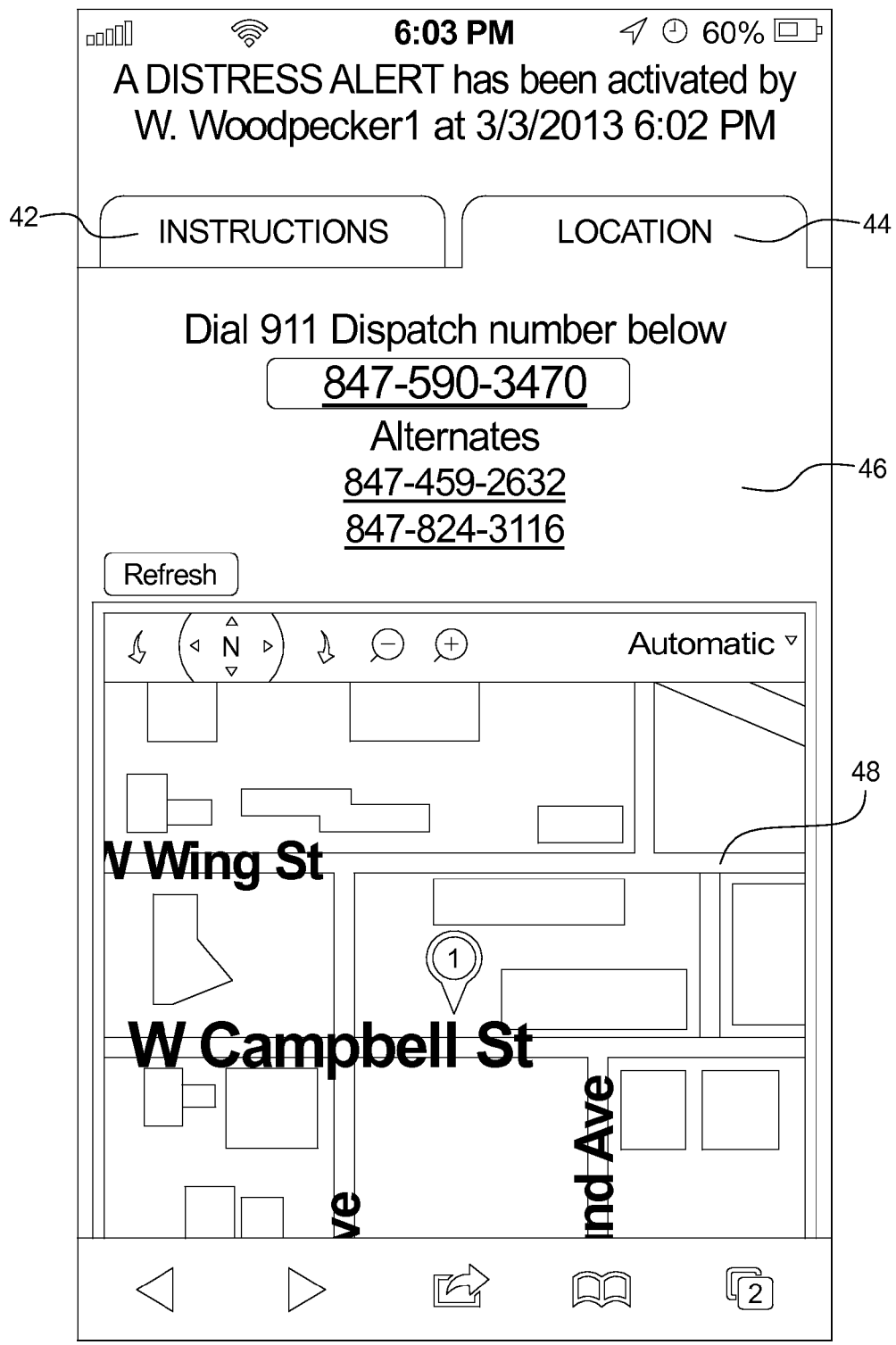
FIG. 6b is an example of location-based information provided to lifelines.

In a preferred embodiment, the information provided to the lifelines 18 may include a set of instructions 42 and location-based information 44. As shown in FIG. 6a, in one example, the instructions 42 may include clear and succinct instructions adapted to most clearly help the lifelines respond appropriately. For example, a set of instructions may include a numbered list of instructions, such as:

1. Do not call the user.
2. Write this address down. This is the closest address to where the Distress Alert was activated. [Address provided.]
3. Click on the LOCATION tab (referencing a location tab on the lifeline's screen).
4. Refer to the map of the user's location. Use the zoom feature to better access the area.

The location-based information 44 may include the one or more direct dial phone numbers for the 911 Command Centers in closest proximity to the event location 46 and a real-time updating map identifying the event location 48. Of course many variations of the information provided to the lifelines may be implemented.

In addition to the features and functions described above, the personal safety system may further provide various recording and/or streaming audio and/or video functions. For example, once a user breaks contact with the armed mobile device, the mobile device may immediately start recording and/or streaming audio and/or video. Any recording may be captured within the mobile device 12. Any streaming may be provided to the system server 14. These functions may be helpful in identifying an assailant or otherwise understanding what occurred immediately following the breaking of contact with the mobile device 12. It is contemplated that in certain versions, the mobile device 12 may record and/or stream audio and/or video anytime the alarm is activated, such that the audio and/or video may be used to identify the events preceding and/or succeeding the time the user breaks contact with the armed mobile device 12.

The geo-locating elements of the mobile device 12 may be further utilized to provide targeted advertising to a user of the mobile device 12. For example, the user may voluntarily enroll in geo-fencing advertising such that the user may select the types of advertising and discounts (e.g., locations, categories, etc.) for which the user would like alerts/notices. Then, when the user passes a location with which advertising is associated, an alert or notification will be triggered on the user's mobile device 12. For example, if a user indicates an interest in "shoes" and then walks past a Footlocker shoe store, the mobile device 12 may be recognized as passing within close proximity to the shoe store and trigger a notification message that provides a discount for shoes at the Footlocker shoe store.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A mobile communication device, comprising:
at least one processor to:
  display a user interface on a touch screen, the user interface comprising a button to receive a touch event by a user;
  determine the touch event is received by the button and enter an armed alarm condition;
  maintain the armed alarm condition while the touch event is continuously being received by the button;
  determine the touch event is no longer received by the button and enter a first triggered alarm condition and, in the first triggered alarm condition transmit to a server location of the mobile communication device indicative of an alarm event for the user so that, after a first particular period of time in the triggered alarm condition, a communication is triggered to an emergency responder unless a first disarm code is received within the first particular period of time;
  if the first disarm code is not received within the first particular period of time, enter a second triggered alarm condition until a second disarm code is received within a second particular period of time, wherein the second particular period of time is greater than the first particular period of time;
  if the second disarm code is not received within the second particular period of time, transmit to the server at least one other location of the mobile communication device for display with the location of the alarm event for the user within a geographical area;
  if the second disarm code is not received within the second particular period of time, transmit to an emergency contact identified by the user a set of instructions including numbered steps instructing the emergency contact how to respond, including the step of noting the at least one other location of the mobile communication device; and
  display an event portal accessible to the user and the emergency responder, wherein the event portal includes an event identification, user identification details, an approximate address of the alarm event, and a map of the geographical area identifying the approximate address of the alarm event, an approximate address of a current location of the mobile communication device, and a location of the emergency responder, and wherein the event portal displays an option to clear the alarm condition and an option to confirm that appropriate action has been taken.

2. The mobile communication device of claim 1, wherein the emergency responder comprises at least one of a 911 command center and a police department.

3. The mobile communication device of claim 1, the at least one processor further to provide an indication that the mobile communication device is in the armed alarm condition, the indication comprising at least one of a visual indication on the touch screen that the mobile communication device is in the armed alarm condition, an audible indication that the mobile communication device is in the armed alarm condition, and a vibration indication that the mobile communication device is in the armed alarm condition.

4. The mobile communication device of claim 1, further comprising a mobile application executable by the at least one processor to present the user interface.

5. The mobile communication device of claim 1, the at least one processor further to:
  after the touch event is no longer received by the button, display a keypad user interface on the touch screen to receive the first disarm code; and
  receive the first disarm code from the keypad user interface during the first particular period of time in the first triggered alarm condition and enter a first disarmed alarm condition.

6. The mobile communication device of claim 1, the at least one processor further to transmit the at least one other location of the mobile communication device to the server for display with the location of the alarm event for the user within the geographical area along with a plurality of other locations of other alarm events in the geographic area.

7. The mobile communication device of claim 1, the at least one processor further to continuously transmit one or more locations of the mobile communication device to the server at least one of (i) while in one of the first and second triggered alarm conditions and (ii) when the mobile device is moved after entering one of the first and second triggered alarm conditions.

8. The mobile communication device of claim 1, the at least one processor further to transmit the location of the mobile communication device for reception by the emergency responder.

9. The mobile communication device of claim 1, the at least one processor further to:
receive personal information about the user;
receive the disarm code from the user; and
store the personal information and the disarm code in a memory of the mobile communication device.

10. The mobile communication device of claim 1, the at least one processor further to continuously transmit one or more other locations of the mobile communication device to the server after being armed and at least until at least one of (i) being disarmed and (ii) ending an alarm.

11. The mobile communication device of claim 1, the at least one processor further to:
receive user information comprising personal information about the user and contact information for at least one contact person;
receive one or more alarm codes for the user comprising at least one of an arm code, the disarm code, and a silent alarm code; and
transmit the user information and the one or more alarm codes to the server.

12. The mobile communication device of claim 1, the at least one processor further to:
receive user information comprising personal information about the user; and
transmit at least some of the personal information about the user for reception by the emergency responder.

13. The mobile communication device of claim 1, the at least one processor further to:
receive contact information for at least one contact person; and
transmit the location of the mobile communication device indicative of the alarm event for the user for reception by the at least one contact person.

14. The mobile communication device of claim 1, wherein the second triggered alarm condition includes activation of a strobe light and sounding of an alarm.

15. A method, comprising:
displaying, by at least one processor, a user interface on a touch screen of a mobile device, the user interface comprising a button to receive a touch event by a user;
determining, by the at least one processor, the touch event is received by the button and entering an armed alarm condition;
maintaining, by the at least one processor, the armed alarm condition while the touch event is continuously received by the button;
determining, by the at least one processor, the touch event is no longer received by the button and entering a first triggered alarm condition and, in the first triggered alarm condition, transmitting to a server location of the mobile communication device indicative of an alarm event for the user so that after a first particular period of time in the first triggered alarm condition, a communication is triggered to an emergency responder unless a first disarm code is received within the first particular period of time;
if the first disarm code is not received within the first particular period of time, entering a second triggered alarm condition until a second disarm code is received within a second particular period of time, wherein the second particular period of time is greater than the first particular period of time;
if the second disarm code is not received within the second particular period of time, transmitting, by the at least one processor, to the server at least one other location of the mobile communication device for display with the location of the alarm event for the user within a geographical area;
if the second disarm code is not received within the second particular period of time, transmit to an emergency contact identified by the user a set of instructions including numbered steps instructing the emergency contact how to respond, including the step of noting the at least one other location of the mobile communication device; and
displaying, by the at least one processor, an event portal accessible to the user and the emergency responder, wherein the event portal includes an event identification, user identification details, an approximate address of the alarm event, and a map of the geographical area identifying the approximate address of the alarm event, an approximate address of a current location of the mobile communication device, and a location of the emergency responder, and wherein the event portal displays an option to clear the alarm condition and an option to confirm that appropriate action has been taken.

16. The method of claim 15, further comprising triggering the communication to the emergency responder comprising at least one of a 911 command center and a police department.

17. The method of claim 15, further comprising providing an indication that the mobile communication device is in the armed alarm condition, the indication comprising at least one of a visual indication on the touch screen that the mobile communication device is in the armed alarm condition, an audible indication that the mobile communication device is in the armed alarm condition, and a vibration indication that the mobile communication device is in the armed alarm condition.

18. The method of claim 15, further comprising presenting the user interface by a mobile application executable by the at least one processor.

19. The method of claim 15, further comprising:
after the touch event is no longer received by the button, displaying a keypad user interface on the touch screen to receive the first disarm code; and
receiving the first disarm code from the keypad user interface during the particular period of time in the first triggered alarm condition and entering a first first disarmed alarm condition.

20. The method of claim 15, further comprising transmitting the at least one other location of the mobile communication device to the server for display with the location of the alarm event for the user within the geographical area along with a plurality of other locations of alarm events in the geographical area.

21. The method of claim 15, further comprising continuously transmitting one or more locations of the mobile communication device to the server at least one or (i) while in one of the first and second triggered alarm condition and (ii) when the mobile device is moved after entering one of the first and second triggered alarm condition.

22. The method of claim 15, further comprising transmitting the location of the mobile communication device for reception by the emergency responder.

23. The method of claim 15, further comprising:
receiving personal information about the user;
receiving the first disarm code from the user; and
storing the personal information and the first disarm code in a memory of the mobile communication device.

24. The method of claim 15, further comprising continuously transmitting one or more other locations of the mobile communication device to the server after being armed and at least until at least one (i) being disarmed and (ii) ending an alarm.

25. The method of claim 15, further comprising:
receiving user information comprising personal information about the user and contact information for at least one contact person;
receiving one or more alarm codes for the user comprising at least one of an arm code, the disarm code, and a silent alarm code; and
transmitting the user information and the one or more alarm codes to the server.

26. The method of claim 15, further comprising:
receiving user information comprising personal information about the user; and
transmitting at least some of the personal information about the user for reception by the emergency responder.

27. The method of claim 15, further comprising:
receiving contact information for at least one contact person; and
transmitting the location of the mobile communication device indicative of the alarm event for the user for reception by the at least one contact person.

28. The method of claim 15, wherein the second triggered alarm condition includes activation of a strobe light and sounding of an alarm.

29. The method of claim 15, wherein the set of instructions includes instructing the emergency contact to write down the at least one other location.

30. A mobile communication device, comprising:
at least one processor to:
display a user interface on a touch screen, the user interface comprising a button to receive a touch event by a user;
determine the touch event is received by the button and enter an armed alarm condition;
maintain the armed alarm condition while the touch event is continuously being received by the button;
determine the touch event is no longer received by the button and enter a triggered alarm condition and, in the triggered alarm condition transmit to a server location of the mobile communication device indicative of an alarm event for the user so that, after a first particular period of time in the triggered alarm condition, a communication is triggered to an emergency responder unless a first disarm code is received within the first particular period of time;
if the first disarm code is not received within the first particular period of time, enter a triggered alarm condition wherein a camera flash strobes and an alarm sound plays unless a second disarm code is received within a second particular period of time, wherein the second particular period of time is greater than the first particular period of time;
if the second disarm code is not received within the second particular period of time, transmit to the server at least one other location of the mobile communication device for display with the location of the alarm event for the user within a geographical area;
if the second disarm code is not received within the second particular period of time, transmit to an emergency contact previously identified by the user a set of instructions including (1) do not call the user, (2) write down the at least one other location, (3) refer to a map of the at least one other location of the mobile communication device; and
display an event portal accessible to the user and the emergency responder, wherein the event portal includes an event identification, user identification details, an approximate address of the alarm event, and a map of the geographical area identifying the approximate address of the alarm event, an approximate address of a current location of the mobile communication device, and a location of the emergency responder, and wherein the event portal displays an option to clear the alarm condition and an option to confirm that appropriate action has been taken.

* * * * *